United States Patent [19]

Gillott et al.

[11] 4,426,456

[45] Jan. 17, 1984

[54] FREEZE/THAW DURABLE SULPHUR COMPOSITIONS

[75] Inventors: Jack E. Gillott; Ian J. Jordaan; Robert E. Loov; Nigel G. Shrive; Michael E. D. Raymont, all of Calgary, Canada

[73] Assignee: Sulphur Development Institute of Canada (SUDIC), Calgary, Canada

[21] Appl. No.: 352,472

[22] Filed: Feb. 26, 1982

Related U.S. Application Data

[63] Continuation of Ser. No. 186,519, Sep. 12, 1980, abandoned.

[51] Int. Cl.³ .................... C04B 21/02; C04B 35/00
[52] U.S. Cl. .................................... 501/84; 501/140; 106/287.32
[58] Field of Search .................. 501/80, 84, 140; 106/287.32

[56] References Cited

U.S. PATENT DOCUMENTS

| | | | |
|---|---|---|---|
| 3,337,355 | 8/1967 | Dale et al. | 501/140 |
| 3,421,911 | 1/1969 | Greco et al. | 501/140 |
| 4,022,857 | 5/1977 | Dale et al. | 501/140 |
| 4,025,352 | 5/1977 | Leutner et al. | 501/140 |
| 4,058,500 | 11/1977 | Vroom | 260/42.24 |
| 4,079,023 | 3/1978 | Woo | 260/2.5 A |
| 4,134,775 | 1/1979 | Schwoegler | 106/DIG. 1 |
| 4,256,499 | 3/1981 | Terrel | 501/140 |

FOREIGN PATENT DOCUMENTS

| | | | |
|---|---|---|---|
| 355976 | 4/1980 | Austria | 501/140 |
| 2833142 | 8/1979 | Fed. Rep. of Germany | 501/140 |

Primary Examiner—James Poer
Attorney, Agent, or Firm—Browdy and Neimark

[57] ABSTRACT

Sulphur compositions, particularly sulphur concretes, mortars and coatings, comprising a sulphur component and a particulate mineral aggregate in which the aggregate is bonded together in a matrix of the sulphur component having a plurality of fine entrained cells, particularly substantially spherical gas cells, uniformly dispersed throughout the matrix, and displaying improved durability under cyclical freezing and thawing.

47 Claims, No Drawings

FREEZE/THAW DURABLE SULPHUR COMPOSITIONS

This is a continuation of application Ser. No. 186,519, filed Sept. 12, 1980, now abandoned.

BACKGROUND OF THE INVENTION (a) Field of the Invention

This invention relates to moldable sulphur compositions and molded articles based on sulphur and mineral aggregate and their method of preparation; more especially the invention is concerned with sulphur concrete, sulphur mortar and other sulphur-bound compositions of improved durability under cyclical freezing and thawing.

(b) Description of the Prior Art

Mixtures of mineral aggretate and sulphur, wherein the sulphur functions as a binder are termed sulphur concretes or sulphur mortars depending on the form of the mineral aggregate.

Articles which may be formed by casting such sulphur concretes include preformed concrete articles conventionally formed from concretes based on a mixture of a hydraulic cement, such as Portland cement, mineral aggregate and water together with various additives. Such articles include paving slabs, structural members, curbing, gutters, pipes and other cast products.

Sulphur mortars may be employed, for example, in the cementing or joining of pipe, bricks and tile, and as coating compositions to provide a protective surface.

Sulphur concretes and mortars display certain advantages, as compared with Portland cement, although they also suffer from certain disadvantages.

Sulphur is available in large quantities both as a by-product of oil refining and natural gas processing in the petroleum industry and from mining of sulphur deposits.

A particular disadvantage of prior sulphur concretes is that they display poor freeze/thaw durability, and thus have poor resistance, and break down, when subjected to repeated cycles of freezing and thawing, in climates such as those encountered in Canada and the Northern States of the U.S.A.

In particular, sulphur concretes and mortars typically have a freeze/thaw life of only up to 80 cycles and frequently only 20 to 40 cycles, whereas a life of at least 300 cycles is the criterion set by ASTM C-666 for acceptable freeze/thaw durability in concretes and mortars to be exposed to the climates of Canada and the Northern States of the U.S.A.

The poor freeze/thaw durability of sulphur concretes is well recognized and has been noted by R. E. Loov—Sulphur Concrete—, State of the Art in 1974, Research Report No. CE75-2, Department of Civil Engineering, The University of Calgary, Alberta, March 1975; V. M. Malhotra, Mineral Properties and Freeze-Thaw Resistance of Sulphur Concrete, Mines Branch Investigation Report 1R 73-18, Department of Energy, Mines and Resources, Ottawa, Ontario, January 1973; J. J. Beaudoin et al., Freeze-Thaw Durability of Sulphur Concrete, Building Research Note No. 92, Division of Building Research, National Research Council, Canada, June 1974; and T. A. Sullivan et al, Development and Testing of Superior Sulfur Concretes, Report of Investigations 8160, Bureau of Mines, United States Department of the Interior, 1976.

In the Portland cement art it is known to entrain air in Portland cement to improve various properties. Such air entrainment is described in U.S. Pat. Nos. 3,615,784; 3,782,983; 4,019,916; and 4,046,582.

The poor freeze-thaw durability of Portland cement concrete has been considered to be due to pressures generated by moisture movement through pores inherent in the structure of such cement. The migration of the water in freeze/thaw cycles results in pressure build-up within the Portland cement structure, and the pressure is relieved by formations of fissures or fractures in the cement, with consequent failure of the cement and concrete.

Formation of air voids and entrainment of air in Portland cement has been utilized to provide spaces or air pockets throughout the Portland cement structure, into which the water inherent in the Portland cement structure can expand during freeze/thaw cycles. In this way pressure build-up is avoided or reduced so that the incidence of fissures or fractures is reduced.

Water is not inherent in sulphur concrete and sulphur mortar structures, and the poor freeze/thaw durability of such sulphur compositions has been considered by the art to be due to expansion and contraction of sulphur crystals in the structure. Sulphur has an unusually high coefficient of thermal expansion ($\alpha \approx 55 \times 10^{-6}/°C$.) and a low thermal conductivity (0.27 W/MK). Temperature gradients in sulphur concrete thus generate high levels of differential stress, and the disintegration or destruction of sulphur concretes under conditions of freezing and thawing has been attributed to this. Efforts to improve the freeze/thaw durability have centered on plasticizing the sulphur and producing a non-crystalline amorphous or polymerized structure or one in which the sulphur crystals are of small size. Characteristics of sulphur cements resulting from dimensional changes in the crystals or from changes in the crystal structure with fluctuating temperature and the use of agents, such as olefine polysulfides, to modify the crystalline habits of sulphur have been described by W. W. Duecker, Admixtures Improve Properties of Sulphur Cements, Chemical & Metallurgical Engineering, Nov. 1934, pp. 583-61.

The need to modify sulphur, as by plasticization to overcome inferior freeze/thaw durability characteristics has also been described by B. R. Currel, New Sulphur-based Coatings, Polymers Paint and Colour Journal, 1978, pages 674-8; T. A. Sullivan and W. C. McBee, Sulphur Institute Journal, Spring 1976, pages 6-8; T. A. Sullivan and W. C. McBee, Development of Specialized Sulphur Concrete, Proc. Int. Conf. on Sulphur in Construction, Ottawa, 1978, Vol. 2, pages 453-474; Sulphur Research and Development Vol. 2, 1979, pages 2-17; V. M. Malhotra, Sulphur Concrete and Sulphur Infiltrated Concrete: Properties, Applications and Limitations, Canmet Report 79-28, Energy, Mines and Resources Canada, May 1979, pages (i) and 2-11; and U.S. Pat. No. 4,058,500 Vroom. In particular Sullivan and McBee and Malhotra refer to the need for modification as by plasticization, because of the transformation of molten sulphur, on cooling below 95.5° C., from the monoclinic form to the orthorhombic crystalline form which is denser, occupies less volume and is subject to disintegration on thermal cycling.

Thus, it has generally been accepted by persons in the art that the poor durability displayed by sulphur concretes and similar sulphur/mineral aggregate compositions, subjected to fluctuating temperature conditions, such as in freeze/thaw cycles, is due to changes in the crystals of the sulphur matrix with temperature. In particular sulphur crystals expand with increase in temperature and contract with decrease in temperature; in addition the molecular structure may change between its various crystalline and non-crystalline forms.

The contractions and expansions experienced in freeze/thaw cycles produce different stresses in the composition, both in the sulphur matrix and between the sulphur matrix and the particles of the aggregate. In particular the volume expansion of the crystals with increase in temperature and/or morphological changes, and the resulting stress produced, was generally accepted as being responsible for the development of fissures or fractures and the consequent deterioration and failure of the composition.

It should be recognized that in the Northern climates of the North American Continent freeze/thaw cycles may occur frequently over short periods of time, with, for example, freezing occurring overnight and thawing during the daylight hours, on a daily basis.

As indicated above by reference to Duecker and others, attempts to overcome the problem of poor freeze/thaw durability in such sulphur compositions have thus focussed on modifying the structure assumed by the sulphur in the solid state.

Sulphur concretes and mortars containing entrained air have not previously been proposed, although foamed sulphur has been described by Dale and Ludwig in U.S. Pat. Nos. 3,337,355 and 4,022,857; the foams of Dale and Ludwig have densities below 30 lbs/cu.ft. Dale and Ludwig found it necessary to employ a viscosity increaser in conjunction with a stabilizing agent in the molten sulphur; the viscosity increaser was considered necessary to retain the gas bubbles from the foaming agent in the molten sulphur, and the stabilizing agent was considered necessary to prevent coalescence of the bubbles.

It is an object of this invention to provide compositions based on sulphur and a mineral aggregate and in particular hot moldable sulphur concretes and mortars, which are freeze/thaw durable.

It is a further object of this invention to provide molded sulphur concrete articles of good freeze/thaw durability.

It is a still further object of this invention to provide a method of producing such compositions and articles.

SUMMARY OF THE INVENTION

It has been found that the entrainment in a composition based on particulate mineral aggregate and a sulphur component of entrained cells, for example air cells, dispersed throughout the composition, produces significant improvement in the freeze/thaw durability.

According to the invention there is provided a composition comprising a particulate mineral aggregate and a sulphur component selected from the group consisting of elemental sulphur, modified sulphur and mixtures thereof, and a plurality of fine entrained cells uniformly dispersed throughout the composition.

In another aspect of the invention there is provided a method of producing a solidified mineral aggregate composition comprising entraining a plurality of fine bubbles in a moldable mixture comprising a particulate mineral aggregate and a molten sulphur component selected from the group consisting of elemental sulphur, modified sulphur and mixtures thereof, uniformly dispersing the fine bubbles in the mixture, and solidifying the mixture to a composition in which a matrix comprising the said bubbles defines a plurality of fine entrained cells.

The terms "hot-moldable" and "molded" in this specification embrace compositions which can be precast into molds or forms, or poured, extruded, trowelled, sprayed, slip formed or paved in place for in situ installation when the sulphur component is in a molten state, as is the case with Portland cement concretes.

DESCRIPTION OF THE PREFERRED EMBODIMENTS

(i) Sulphur Compositions

The sulphur compositions are, in particular, hot moldable sulphur concrete, sulphur mortar and sulphur coating compositions and molded sulphur concrete articles in which particles of the mineral aggregate are bonded together in a matrix of the sulphur component, the cells being uniformly dispersed throughout the matrix.

(a) Cells

The cells are, in particular, small spaces or pockets positively introduced into the composition by entrainment. The cells are substantially spherical or at least spheroidal and of small size. As such the cells are distinguished from air voids, which are generally irregular in shape, and comprise entrapped air.

The voids occur to the extent that the sulphur component fails to fill the free volume between the aggregate particles. The voids represent weak points which deleteriously affect the strength of the composition and desirably are maintained at a minimum. It is impracticable in commercial production to attain a completely void-free composition and typically the sulphur concretes of the invention will have a void volume of about 1 to 5% of the volume of the concrete.

The cells may typically have a diameter of 0.05 to 0.5 mm and are dispersed throughout the matrix of the sulphur component. It is preferred that the cells be of a substantially uniform size and that they be dispersed substantially uniformly throughout the matrix of the sulphur component.

The volume and distribution of the cells is significant in improving the freeze/thaw durability. If the spacing between the cells is too large, the freeze/thaw durability is not improved. In general the maximum spacing factor of the cells is about 2 mm and the average spacing factor is typically about 0.1 to about 1.5 mm by ASTM C457-71, the spacing factor being the maximum distance of any point in the sulphur component matrix from the periphery of a cell.

The cells will generally occupy not more than 50% periphery not more than 25% and typically not more than 15% by volume of the composition.

Typically when the cells occupy not more than 15% by volume of the composition, of the remaining solid portion of the composition the matrix occupies about 15% by volume. Thus in the sulphur component matrix in the compositions of the invention the volume occupied by the cells is not more than about 50%, at most. For this case, in a sulphur concrete having a cell volume in the matrix of about 50%, the density would typically be about 120–140 lbs./cu.ft., which is markedly different from the foams of Dale and Ludwig mentioned previously.

Suitably the cells may comprise from about 4 to about 15% by volume of the composition.

The cells most suitably comprise cells of an inert gas. Suitable gases include nitrogen, oxygen, carbon dioxide, the rare gases, and halocarbons; the cells may also comprise mixture of such gases and air is the preferred gas. The requirement of the inert gas is that it not interfere or react with the sulphur component or other ingredients which may be present in the sulphur composition. Gases which are toxic, inflammable or otherwise hazardous to the environment are also desirably avoided although insofar as they form cells in the matrix of the sulphur component they can be expected to improve the freeze/thaw durability as satisfactorily as the preferred gases.

As the inert gas there may also be employed substances which might be liquid at normal temperatures but are gaseous at the temperature of the molten sulphur, for example water vapour, however such substances are in general less preferred in that they expend energy to convert and maintain substances which are otherwise liquid, in a gaseous form. Further, there is no apparent advantage to be obtained by the use of such materials.

In the case of such gas cells, the wall of the cell is defined by the sulphur component, however, this is not essential. The cells may, for example, comprise hollow microporous spheres, for example hollow microporous glass spheres having a diameter typically in the range of about 20 to about 130 micrometers with a wall thickness of about 0.5 to about 2.0 micrometers, and an average density of about 0.1 to 0.4, preferably 0.1 to 0.275 g/cc.

The cells may also be defined by a finely divided, porous particulate material distributed throughout the matrix of the sulphur component, such material includes crushed lightweight porous aggregate and expanded shale.

The cells may also be defined by a fine or coarse porous particulate material which replaces all or part of the mineral aggregate component of compositions. Suitable materials include porous lightweight aggregate and expanded shale.

(b) Freeze/Thaw Durability

As indicated previously, conventional sulphur concretes and mortars typically have a freeze/thaw life of up to 80 cycles. The sulphur compositions of the invention typically have a freeze/thaw durability of at least 100 cycles, and more usually at least about 200 cycles; and sulphur concretes and mortars can be readily produced, in accordance with the invention, having a freeze/thaw durability of greater than 300 cycles, and thereby meeting the requirements of ASTM C-666.

It is believed that the traditional view of the mechanism of failure of sulphur concretes and mortars, as outlined hereinbefore, is not the sole mechanism of failure, and the present invention resides, in part, in the recognition that the traditionally accepted mechanism is not the sole mechanism.

While the inventors do no wish to be bound by any theory it is believed that water or moisture penetrates the sulphur composition, for example sulphur concrete or mortar, especially during thaw cycles and that such water migrates through the sulphur matrix. The migration of the water in the matrix is promoted both during the freeze and thaw cycles.

During the freeze cycle a vapour pressure differential is developed between the moisture within the matrix and water at the surface of the concrete or mortar or within large voids or cracks, which moisture or water may be in the form of ice. The water within the matrix is in a higher energy state than the water or ice at the surface, and the latter has a lower free energy and vapour pressure, thereby resulting in a vapour pressure differential or gradient. This differential or gradient provides the driving force for migration of the water within the matrix towards the surface or cavity within the matrix.

During a thaw cycle there is a tendency for water to seep into the concrete or mortar, where it may saturate the matrix and aggregate. When the air voids become filled with water the concrete becomes susceptible to frost action.

The migration of the water produces pressure build-up within the sulphur matrix, and when the pressure is more than the strength of the matrix can withstand, fissures or fractures are formed in the matrix or at the matrix-aggregate bond. In addition the expansion of water to form ice during freezing of water in cavities also produces stresses which can result in fissures or fractures.

In the present invention it is believed that the migrating water enters the cells, which results in a drop in the pressure and thus in the migrating force; also the water can expand into the cells when freezing into ice. Thus the cells provide pressure relief points throughout the matrix.

While not wishing to be bound by this theory of the mechanism, the theory does explain why the spacing of the cells is significant. Clearly if the spacing is large, water migrating between cells in the matrix can produce pressure build-up resulting in fissure or fraction before the migrating water reaches a pressure relieving cell.

This theory of the mechanism also explains why the nature of the gas in the cell is not critical and indeed the cells could be vacuum pockets. In the case where the cells are defined by hollow microporous glass spheres it is believed that the water migrates into the spheres through the microporous wall structure of the spheres.

(ii) Sulphur Component

The sulphur component may be elemental sulphur or modified elemental sulphur. Modified elemental sulphur is sulphur which has been plasticized; plasticizers for sulphur are known and include dicyclopentadiene, styrene, vinyl toluene, coal tar, terpene polysulphides and olefinic hydrocarbon polymers (U.S. Pat. No. 4,058,500—Vroom, the disclosure of which is herein incorporated by reference), and mixtures thereof.

Modified elemental sulphur produces sulphur concretes within the invention which demonstrate ductility characteristics superior to those of the sulphur concretes of the invention, which contain unmodified elemental sulphur.

The modified sulphur suitably contains about 1 to 10% by weight of the plasticizer, based on the weight of elemental sulphur.

The sulphur component acts as the bonding agent in the composition. It bonds the mineral aggregate particles in a matrix of the sulphur component.

The sulphur component also serves as the medium to hold the cells, and in the case of gas cells, for example air cells, the sulphur component defines the walls of the cells.

The sulphur component is suitably employed in an amount of 5 to 98%, with concretes and mortars generally containing from 5 to 60% by weight of the composition, the amount depending on the properties required in the composition and the aggregate employed.

(iii) Aggregates

The mineral aggregates in the compositions of the invention may include coarse aggregate, fine aggregate and fines.

Coarse aggregate includes gravel, crushed stone, slag and other material of mineral composition having a particle size of at least 4.75 mm and particularly 1.5 cm to 4 cm.

Coarse aggregate is sometimes frost susceptible, probably because of the pore structure in the aggregae and therefore use of such aggregate is less preferred, or in any event it is preferable that such aggregate be used in lesser amounts.

Fine aggregte includes sand and other material of mineral composition having a particle size of about 150 μm to about 4.75 mm.

Fines include fly ash, pyrrhotite, crushed shale, illite and other material of mineral composition having a particle size less than about 150 μm.

Generally speaking sulphur mortars contain no coarse aggregate, whereas sulphur concretes contain a major amount of coarse aggregate. A sulphur concrete should suitably contain as much coarse material as possible so as to occupy the major volume of the concrete, thereby reducing the amount of the more expensive sulphur which is needed.

The mineral aggregate may also comprise natural soil, in which case a sulphur/soil composition of improved freeze/thaw durability could be employed as a base for a paved surface, for example, a road.

Natural soil is in engineering terms understood to be earth material between the earth's surface and the bed rock; as such this includes sub-soil, top soil, humus, garden soil and mixtures of any of the coarse aggregate, fine aggregate and fines, described above, with or without such earth material.

(iv) Sulphur Concretes, Mortars and Coatings

The sulphur compositions of the invention need not contain all three classes of aggretate, and, as indicated previously, mortars will generally contain no coarse aggregate. However, while acceptable concretes might be obtained containing only one or two of these three classes of aggregate, the preferred concretes will contain all three classes so as to obtain the closest packing and reduce the void filling volume of sulphur.

The content and form of coarse aggregate in the sulphur composition will determine if the composition is most suitably considered a concrete, mortar or coating. If, for example, the content of coarse aggregate is relatively low and the particle size is at the lower end close to the fine aggregate range, then the sulphur composition may be more appropriately employed as, and considered as, a mortar, even though it contains coarse aggregate.

Similarly if the particle size of the fine aggregate is at the low end of the range it may be satisfactory to omit fines from the composition thereby reducing the cost since the fines are relatively expensive.

The mineral aggregate is composed of one or more of coarse aggregate, fine aggregate and fines, or soil or soil mixed with mineral aggregate. Suitably the mineral aggregate may comprise 0 to 100% of each of coarse aggregate, fine aggregate, fines and soil, to a total of 100%.

(a) Concretes

Sulphur concretes most suitably include a mixture of coarse aggregate, fine aggregate and fines as the mineral aggregate. Suitably the mineral aggregate may comprise 10 to 90%, preferably 15 to 80% and more preferably 25 to 55%, by weight of coarse aggregate; 5 to 90%, preferably 5 to 85%, more preferably 30 to 85%, and most preferably 35 to 60%, by weight of fine aggregate; and 0 to 30%, preferably 0 to 20%, more preferably 5 to 15%, by weight of fines. The aggregate ingredients are selected within these ranges to a total of 100%, based on the total weight of mineral aggregate.

Suitably the sulphur concretes will contain in weight percent, 5 to 50%, preferably 5 to 30% and more preferably about 5 to 20% of the sulphur component; and 50 to 95%, preferably 70 to 95% and more preferably about 80 to 95% of mineral aggregate to a total of 100%.

Generally it is preferred to have a content of fines, particularly when coarse aggregate is present as in a sulphur concrete. The fines counteract the tendency for segregation of the sulphur from the larger aggregate particles, particularly the coarse aggregate. The fines also act to provide crystal nucleation sites and reduce the occurrence of cavities which develop with shrinkage of the sulphur composition which arises from the change in density of the sulphur on solidifying.

The fine aggregate and fines content affects the workability of the sulphur composition; and in particular improves the workability of the composition. However, too great a content of fine aggregate and/or fines will render the composition stiff so that it is more difficult to work.

(b) Sulphur Mortars

Sulphur mortars most suitably comprise 20 to 60%, more preferably 35 to 50%, by weight of the sulphur component, and 40 to 80%, more preferably 50 to 75%, by weight of the mineral aggregate, based on the weight of the mortar.

The mineral aggregate is suitably composed of fine aggregate and fines with no coarse aggregate. Generally, the mineral aggregate may comprise 0 to 100%, preferably 30 to 70%, by weight of fine aggregate and 0 to 100%, preferably 30 to 70%, by weight of fines, to a total of 100%, based on the total weight of mineral aggregate.

(c) Sulphur Coatings

Sulphur coatings may be in a sprayable form or in a form for application by other means.

Suitably the coatings may contain 60 to 98%, and preferably 75 to 90%, by weight of the sulphur component, and 2 to 40%, preferably 10 to 25%, by weight of mineral aggregate in the form of fine aggregate and fines.

(v) Cell Entrainment

The cells can be entrained in the sulphur composition in a number of ways:
(i) Mechanical entrainment of gas bubbles,
(ii) Mechanical entrainment of hollow microporous spheres,
(iii) Finely divided material which evolves gas,
(iv) Reaction of chemicals with evolution of gas,
(v) Entrainment of porous particulate material.

Method (i), the mechanical entrainment of gas bubbles, utilizes a gas-entraining agent which comprises a surfactant which modifies the surface tension properties of the molten sulphur component to favour the formation of fine gas bubbles during agitation of the sulphur composition in a state in which the sulphur component is molten. In particular the gas-entraining agent may be an air-entraining agent.

The gas-entraining agent may be added to the molten sulphur component and mixed therewith before the molten component is fixed with the mineral aggregate or after the addition of the molten sulphur component to the mineral aggregate.

The gas-entraining agent is mixed into the composition so that it is uniformly distributed throughout the molten component. The mixing can be carried out in a conventional mixer, for example a drum mixer in an atmosphere of the gas to be entrained, for example air. Using a drum mixer it is found adequate to mix the ingredients for 1 to 3, preferably about 2 minutes.

Suitable surfactants include saturated hydrocarbon sodium sulphonates, hydroxy functional, low molecular weight silicones and polyisocyanates, but any surfactant which will modify the surface tension of the molten sulphur component to effect fine bubble formation under conditions of agitation, can be employed.

Usually these surfactants have no apparent effect on the viscosity of the mixture of molten sulphur component and aggregate, however, surfactants which coincidentally alter the viscosity while modifying the surface tension may be used provided the entrained gas bubbles are still formed in the appopriate size and distribution ranges.

Method (ii), the mechanical entrainment of hollow microporous spheres, in essence involves the dispersion of preformed cells throughout the molten sulphur component. It is found appropriate to preheat the spheres, suitably to the temperature of the molten sulphur component. The spheres can be mixed with the molten sulphur component before it is mixed with the aggregate, although it is preferred to add the spheres to the mixture of molten sulphur component and aggregate.

By way of example there may be employed 3M Brand Glass Bubbles which have a porosity defined by their oil absorption of 30 to 40, and preferably 31 to 36 gm of oil/100 cc bubbles, by ASTM D-1483-60.

Method (iii) utilizes a finely divided material which will thermally decompose, to evolve gas, or which will dissociate to evolve an adsorbed gas or water associated with the material or from which entrapped liquid or gas can be liberated as gaseous material, at the temperature of the molten sulphur component. The finely divided material is distributed through the molten sulphur component and the gas bubbles are formed at the locations of the finely divided material.

Suitable finely divided materials include conventional blowing agents, for example, azodicarbonamide and calcium carbonate. The calcium carbonate has been successfully utilized at temperatures well below its thermal decomposition temperature, and it is thought that the cells are formed by evolution of carbon dioxide by acid decomposition of the calcium carbonate or possibly evolution of water vapour, formed from water associated with the calcium carbonate. On the other hand, initial attempts to use gypsum did not prove particularly satisfactory.

Method (iv) utilizes chemicals which react together to form gas. In particular there may be employed the reaction of an inorganic sulphide, for example a phosphorus sulphide with an acid. Suitably the finely divided sulphide is dispersed throughout the composition containing the molten sulphur component and then the acid is mixed into the mixture.

Method (v) is similar to method (ii) in that it involves the entrainment of preformed cells throughout the molten sulphur component. In this case the cells are defined in fully divided porous particulate material; in this case the particulate material is distributed through the sulphur binder matrix and may take the place of part or all of the fines.

Suitable finely divided porous particulate materials, include expanded shale, expanded clays, expanded slags, pumice, diatomaceous earth, ground brick particles and fired clay particles. The porous particulate material is generally employed in amounts up to 100% by weight, of the sulphur component.

Method (v) may also involve the use of coarse or fine porous particulate material which may take the place of part or all of the mineral aggregate. In this case the cells are defined in the coarse or fine porous particulate material. Suitable coarse or fine porous materials include those listed above. In this case the coarse or fine porous particulate material may replace all or part of the coarse or fine mineral aggregate.

In manufacturing the composition of the invention it is appropriate to heat the particulate mineral aggregate to a temperature close to that of the molten sulphur component, before mixing the aggregate and molten sulphur component. Prolonged heating, for example of 4 hours or more, of the aggregate in a current of air is desirable to remove water which may be present in the aggregate. In the case of gas entrainment method (v) and the use of calcium carbonate in gas entrainment method (iii), the porous particulate material or the calcium carbonate can be heated with the mineral aggregate.

The mixing of the heated aggregate and the molten sulphur component is suitably carried out at an elevated temperature effective to maintain the sulphur component in a molten state and below the temperaure at which sulphur polymerizes to a high viscosity material.

Thus the mixing is generally carried out at a temperature of 115° C. to about 160° C. Above 159° C., sulphur begins to polymerize, while below 115° C. solidification occurs. Within this temperature range sulphur is a low viscosity liquid and can be readily mixed with mineral aggregate.

In a preferred procedure the mineral aggregate is first pre-heated to a temperature in the molten sulphur range, i.e. 115° C. to 160° C., preferably below 159° C., more preferably about 120° C. to about 140° C., most preferably about 135° C. The pre-heated mineral aggregate is then mixed, in a suitable mixer, for example, a concrete mixer, with the molten sulphur component, until a substantially homogeneous mixture is obtained; the temperature being maintained throughout the mixing. The hot mix is subsequently cast to the desired shape, in the case of a sulphur concrete, or may be used directly, in the case of a mortar. However, sulphur mortars can also be moulded to form articles.

Although conventional aggregate handling techniques may be used it may be advantageous to add the fines after the addition of the molten sulphur to the remaining portion of the mineral aggregate, as this may avoid the formation of a dust composed of the fines.

Pre-heating of the mineral aggregate is desirable to avoid solidification of the molten sulphur component, by contact with mineral aggregate at a lower temperature, and to reduce the mixing time.

The point of introduction of the gas-entraining or cell-defining agent depends on the cell-entraining method employed.

The mixing time is not critical and will depend on the nature of the mixing apparatus. A minimum mixing time of 2 minutes was employed using a 1.5 cu.ft. Monarch mixer driven by a ⅛ H.P. motor, at 30 cycles per minute (0.5 Hz); however, a shorter minimum mixing time could be employed with a faster mixer.

The hot mix could be made in other ways, for example, non-molten sulphur component, for example, powdered, crushed, flaked or pelletized sulphur, can be mixed with the mineral aggregate, whereafter the mixture is heated to melt the sulphur. In another common method, for example, non-molten sulphur, for example, powdered, crushed, flaked or pelletized sulphur can be mixed with preheated mineral aggregate whereafter the composition is mixed, the sulphur being melted by the heat of the mineral aggregate. In these cases the gas-entraining or cell-defining agent can be added before or after the addition of the sulphur and before or after the melting of the sulphur.

(vi) Other Additives

The sulphur compositions of the invention may advantageously include other additives, for example fire retardant agents such as 1,5,9-cyclododecatriene.

It has also been found to be especially advantageous to include in the sulphur composition of the invention a petroleum or polyol additive, particularly a petroleum additive, in accordance with U.S. Pat. No. 4,188,230, the disclosure of which is hereby incorporated herein by reference. In particular the petroleum additives include crude oil, the pentane soluble maltene fraction of crude oil, the residuum from fractional distillation of crude oil, the crude oil fractions distilling in the temperature range of 250° C. to 400° C. and mixtures thereof, and are included in an amount of 0.1 to 50, and preferably 0.5 to 10%, by weight of the sulphur component.

The presence of these additives does not appear to affect the ability of the sulphur composition to retain the uniformly dispersed cells, and permits the production of sulphur concretes, mortars and coatings having the desirable improved freeze/thaw durability characteristics, as well as water resistance and good ductility characteristics.

EXAMPLES

Example 1 (Comparison Example)

A mineral aggregate comprising 20 kg of coarse aggregate and 55 kg of fine aggregate was heated for approximately 4 hours at 130° C. in a forced air oven. The heated aggregate was transferred to a 1.5 ft³ drum mixer, and 25 kg of fines were added, whereafter the contents of the mixer were mixed for 2 minutes. Molten sulphur in an amount of 18 kg was poured onto the mixture and the mixing was continued for 2 minutes. The resulting sulphur concrete was cast into steel molds, which were vibrated during the casting and the samples were allowed to cool overnight, at room temperature, before demolding.

In this way there were obtained molded cylinders 3 in. × 6 in., molded prisms 3 in. × 3 in. × 15 in. and 4 in. × 4 in. × 14 in. The cylinders were prepared for compressive strength tests, the 3 in. prisms for freeze/thaw tests; and the 4 in. prisms for air cell analysis.

The coarse aggregate was limestone from Steel Bros., Exshaw, Alberta, the fine aggregate poultry grit and the fines fly ash.

Example 2

The procedure of Example 1 was repeated except that 3.6 g of a surfactant available from Dow Corning under the trademark DCZ-6018 which is a hydroxy functional, low molecular weight silicone was added to the molten sulphur and was mixed with the molten sulphur for about 2 minutes before the molten sulphur was poured onto the aggregate mixture.

Example 3

The procedure of Example 2 was repeated with 36 g of the surfactant, and a mixing time for the molten sulphur with the surfactant of 3 minutes.

Example 4

The procedure of Example 2 was repeated with 180 g of the surfactant, and a mixing time for the molten sulphur with the surfactant of 4 minutes.

Example 5

The procedure of Example 2 was repeated with 360 g of the surfactant, and a mixing time for the molten sulphur with the surfactant of 4 to 5 minutes.

Example 6

The procedure of Example 2 was repeated with 540 g of the surfactant, and a mixing time for the molten sulphur and surfactant of 5 minutes.

Example 7

The procedure of Example 1 was repeated except that 36 g of a sodium sulphonate surfactant, available from E. I. Du Pont de Nemours under the trade mark Alkanol 189-S, was added to the mixture of aggregate and molten sulphur in the drum mixer and mixed therewith for the final 2 minute period indicated in Example 1.

Example 8

The procedure of Example 7 was repeated with 360 g of the surfactant.

Example 9

The procedure of Example 1 was repeated except that the fly ash was replaced with 25 kg of calcium carbonate.

Example 10

A mixture comprising 47 kg of lightweight coarse and 46 kg of expanded shale was heated for a minimum of 4 hours at 130° C. in a forced air oven. The heated aggregate was transferred to a 1.5 ft³ drum mixer and 9 kg of fly ash was added, whereafter the contents of the mixer were mixed for 2 minutes. Molten sulphur in an amount of 30 kg was poured onto the mixture and the mixing was continued for 2 minutes. The resulting mixture was cast as described in Example 1.

The expanded shale was obtained from Consolidated Concrete Ltd., Alberta, under the trade mark Herculite.

Example 11

A mixture comprising 40 kg of lightweight coarse and 32 kg of the expanded shale of Example 10 was heated for a minimum of 4 hours at 130° C. in a forced air oven. The heated aggregate was transferred to a 1.5 ft³ drum mixer and 28 kg of pyrrhotite was added whereafter the contents of the mixer were mixed for 2 minutes. Molten sulphur in an amount of 41 kg was poured onto the mixture and the mixing was continued for 2 minutes. The resulting mixture was cast as described in Example 1.

Example 12 (Comparison Example)

A mineral aggregate comprising 20 kg of coarse aggregate and 55 kg of fine aggregate was heated for a minimum of 4 hours at 130° C. in a forced air oven. The heated aggregate was transferred to a 1.5 ft³ drum mixer and 360 g of heavy fuel oil (mixture of crude oil fractions) was added to the heated aggregate, whereafter the contents of the mixer were mixed for 2 minutes. To the mixer was added 25 kg of fines and the mixing was continued for a further 2 minutes. Molten sulphur in an amount of 18 kg was poured onto the mixture and the mixing was continued for still a further 2 minutes. The resulting mixture was cast as described in Example 1.

The coarse aggregate, fine aggregate and fines were those described in Example 1.

Example 13

The procedure of Example 12 was repeated using 180 kg of the heavy fuel oil and 20 kg of the molten sulphur, except that hollow glass spheres, heated for a minimum of 4 hours at 130° C. in a forced air oven, were added to the drum mixer after the molten sulphur had been mixed with the aggregate for 2 minutes and the mixing was continued thereafter for a further 2 minutes. The glass spheres were added in an amount of 50%, by volume, of the volume of molten sulphur.

The glass spheres were 3M Brand Glass Bubbles, type B15/250, having a nominal average particle density of 0.15 g/cc and a range of 0.12–0.18 g/cc by ASTM D-2840-69; a nominal bulk density of 0.10 g/cc and a strength of 250 psi determined as the pressure for 10% collapse by ASTM D-3102-72 (using glycerol in place of water).

Example 14

The procedure of Example 12 was repeated except that 3.6 g of the surfactant employed in Examples 2 to 6 were added to the molten sulphur and were mixed with the molten sulphur for about 2 minutes before the molten sulphur was poured into the mixer.

Example 15

The procedure of Example 14 was repeated with 36 g of the surfactant and a mixing time for the molten sulphur and surfactant of 3 minutes.

Example 16

The procedure of Example 14 was repeated with 360 g of the surfactant and a mixing time for the molten sulphur and surfactant of 4 to 5 minutes.

Example 17

The procedure of Example 12 was repeated except that 36 g of the surfactant of Examples 7 and 8 was added to the mixture of aggregate, heavy oil and molten sulphur in the drum mixer and mixed therewith for the final 2 minute period indicated in Example 12.

Example 18

The procedure of Example 17 was repeated with 360 g of the surfactant.

Example 19

The procedure of Example 12 was repeated except that the fly ash was replaced with 25 kg of calcium carbonate, and the fuel oil addition was reduced to 90 g.

Example 20

The procedure of Example 19 was repeated with a fuel oil addition of 180 g.

Example 21

The procedure of Example 12 was repeated except that the fly ash was replaced with 25 kg of calcium carbonate.

Example 22

The procedure of Example 19 was repeated with a fuel oil addition of 900 g.

Example 23

The procedure of Example 19 was repeated with a fuel oil addition of 1.8 kg.

Example 24

The procedure of Example 12 was repeated with a fuel oil addition of 1.8 kg.

Example 25

The procedure of Example 12 was repeated except that 3.6 g of a surfactant available from Dow Corning under the trade mark DCX-2-3198, a polysiloxane liquid partially soluble in sulphur, was added to the molten sulphur and mixed with the molten sulphur for about 2 minutes before the molten sulphur was poured into the mixer.

Example 26

Tests were carried out on the molded prisms of Examples 1 to 25 in order to demonstrate the improved freeze/thaw durability of the compositions of the invention, illustrated by Examples 2 to 11 and 13 to 23 and 25, in comparison with prior compositions containing no cells, as illustrated by comparison Examples 1, 12 and 24. In addition the air cell content of the molded articles and the spacing factor was determined for some of the Examples. The results are tabulated in Tables I and II below:

TABLE I

Thaw Durability of Sulphur Concretes

| Ex. No. | Additive | No. of Cycles to failure*[1] | Air Cell Content (%)*[5] | Mean Cell Spacing Factor (mm)*[6] |
|---|---|---|---|---|
| 1 | — | 80 | | |
| 2 | DCZ-6018*[2] | 330 NF*[3] | 6.0 | 0.30 |
| 3 | DCZ-6018*[2] | 481 NF | 8.3 | 0.21 |
| 4 | DCZ-6018*[2] | 330 NF | 14.2 | 0.14 |
| 5 | DCZ-6018*[2] | 372 NF | | |
| 6 | DCZ-6018*[2] | 311 NF | 13.4 | 0.19 |
| 7 | Alkanol 189-S*[4] | 130 | | |
| 8 | Alkanol 189-S*[4] | 190 | | |
| 9 | Calcium Carbonate | 104 | 4.4 | 1.37 |
| 10 | Expanded Shale | 318 NF | | |

TABLE I-continued

Thaw Durability of Sulphur Concretes

| Ex. No. | Additive | No. of Cycles to failure*(1) | Air Cell Content (%)*(5) | Mean Cell Spacing Factor (mm)*(6) |
|---|---|---|---|---|
| 11 | Expanded Shale | 308 NF | | |

Notes:
*(1)ASTM C666 freezing and thawing in water.
*(2)percentages are by weight of sulphur. DCZ-6018 is a surface active agent supplied by Dow Corning Ltd.
*(3)N.F.: specimen had not failed test at this number of cycles. 300 cycles are required to pass the test.
*(4)trade mark of E.I. Dupont de Nemours.
*(5)expressed as volume percent of the composition.
*(6)ASTM C457-71.

TABLE II

Freeze/Thaw Durability of Sulphur Concretes Containing Heavy Fuel Oil

| Ex. No. | % Fuel Oil (by wt. sulphur) | Additive | No. of Cycles to failure | Air Cell Content (%) | Mean Cell Spacing Factor (mm) |
|---|---|---|---|---|---|
| 12 | 2% | — | 80 | | |
| 13 | 1% | B15/250 Glass Bubbles | 290 | 11.9 | 0.10 |
| 14 | 2% | DCZ-6018 | 111 | | |
| 15 | 2% | DCZ-6018 | 144 | | |
| 16 | 2% | DCZ-6018 | 182 | | |
| 17 | 2% | Alkanol 189.5 | 120 | | |
| 18 | 2% | Alkanol 189.5 | 208 | | |
| 19 | 0.5% | Calcium Carbonate | 170 | 1.11 | 0.36 |
| 20 | 1% | Calcium Carbonate | 320 | 6.5 | 0.28 |
| 21 | 2% | Calcium Carbonate | 520 | 8.7 | 0.25 |
| 22 | 5% | Calcium Carbonate | 255 | 4.4 | 1.14 |
| 23 | 10% | Calcium Carbonate | 194 | 4.8 | 1.30 |
| 24 | 10% | Calcium Carbonate | 185 | | |
| 25 | 2% | DCX-2-3198 | 258 | | |

The test parameters and procedures are as indicated in Table I.

The data tabulated in Tables I and II illustrates the dramatic improvement in the freeze/thaw durability which can be obtained in accordance with the teachings of the invention.

Example 27

Compressive tests were carried out on molded cylinders of the Examples. The results are tabulated in Table III below:

TABLE III

Strength Comparisons

| Ex. No. | Compressive Strength MPa[1] |
|---|---|
| 4 | 45.6 |
| 3 | 44.7 |
| 4 | 38.3 |
| 6 | 34.6 |
| 9 | 64.2 |
| 13 | 18.7 |
| 15 | 23.2 |
| 16 | 21.9 |
| 19 | 37.4 |
| 20 | 34.6 |
| 21 | 31.2 |

[1]Strength is in units of MPa, the S.I. term for MN/m² (1N/m² = 1 Pascal). The strength was determined from compression tests on cylinders 3 ins. in diameter and 6 ins. long.

We claim:

1. A composition comprising a particulate mineral aggregate and a sulphur component selectd from the group consisting of elemental sulphur, modified sulphur and mixtures thereof, and a plurality of fine entrained substantially spherical cells uniformly dispersed throughout the composition, said sulphur component being present in an amount of 5 to 60%, by weight, of said composition and said cells comprising gas cells with cell walls defined by the sulphur component.

2. A composition according to claim 1, wherein said cells comprise gas cells with cell walls defined by the sulphur component, said cells having an average spacing factor of 0.1 to 1.5 mm and said cells comprise from about 4 to about 15%, by volume, of the composition.

3. A composition according to claim 2, wherein said cells have a diameter of 0.05 to 0.5 mm.

4. A composition according to claim 2, wherein said sulphur component is elemental sulphur.

5. A composition comprising a particulate mineral aggregate and a sulphur component selected from the group consisting of elemental sulphur, modified sulphur and mixtures thereof, and a plurality of fine entrained cells uniformly dispersed throughout the composition, said sulphur component being present in an amount of 5-60% by wt. of said composition wherein said cells comprise hollow, microporous glass spheres having a diameter of about 20 to about 130 microns, a wall thickness of about 0.5 to about 2.0 microns and an oil absorption of 30 to 40 g oil/100 cc.

6. A composition according to claim 1, wherein said composition comprises particulate calcium carbonate, said cells being derived from said calcium carbonate.

7. A composition according to claim 1, further including a petroleum additive in an amount of 0.1 to 50%, by weight, based on the weight of the sulphur component, said additive being selected from the group consisting of crude oil, the pentane soluble maltene fraction of crude oil, the residuum from fractional distillation of crude oil, the crude oil fractions distilling in the temperature range of 250° C. to 400° C. and mixtures thereof.

8. A sulphur concrete or mortar comprising a particulate mineral aggregate and a sulphur component selected from the group consisting of elemental sulphur, modified sulphur and mixtures thereof, said sulphur being present in an amount of 5 to 60%, by weight, of said composition, particles of the aggregate being bonded together in a matrix of the sulphur component, and a plurality of fine, entrained, substantially spherical, gas cells uniformly dispersed through the matrix and said cells comprising gas cells with cell walls defined by the sulphur component; said composition having a durability under cyclical freezing and thawing of at least 100 cycles.

9. A composition according to claim 8, wherein said cells have a maximum spacing factor in the sulphur component of about 2 mm.

10. A composition according to claim 9, wherein said cells have an average spacing factor of about 0.1 to about 1.5 mm; said cells having a diameter of 0.05 to 0.5 mm and occupying not more than 50%, by volume, of the matrix.

11. A composition according to claim 10, wherein said durability is at least 200 cycles.

12. A composition according to claim 11, wherein said sulphur component is elemental sulphur.

13. A composition according to claim 10, in the form of a sulphur concrete containing 5 to 30%, by weight, of said sulphur component.

14. A composition according to claim 10, in the form of a sulphur mortar containing 20 to 60%, by weight, of said sulphur component.

15. A sulphur coating composition comprising a particulate mineral aggregate and a sulphur component selected from the group consisting of elemental sulphur, modified sulphur and mixtures thereof, said sulphur being present in an amount of 75 to 90%, by weight, particles of the aggregate being bonded together in a matrix of the sulphur component, and a plurality of fine, entrained, substantially spherical, gas cells uniformly dispersed through the matrix, said cells having a maximum spacing factor of 2 mm and occupying not more than 50%, by volume, of the matrix and said cells comprising gas cells with cell walls defined by the sulphur component.

16. A sulphur coating composition according to claim 15, wherein said cells have an average spacing factor of 0.1 to 1.5 mm and a diameter of 0.05 to 0.5 mm.

17. A method of producing a solidified mineral aggregate composition comprising:
   entraining a plurality of fine bubbles in a moldable mixture comprising a particulate mineral aggregate and a molten sulphur component selected from the group consisting of elemental sulphur, modified sulphur and mixtures thereof,
   uniformly dispersing the fine bubbles in the mixture as gas cells and
   solidifying the mixture to a composition in which the matrix comprising the said bubbles defines a plurality of fine entrained cells, said mixture comprising 5 to 60%, by weight, of said sulphur component and said gas cells having cell walls defined by the sulphur component.

18. A method according to claim 17, wherein said moldable mixture contains a surfactant effective to modify the surface tension of the molten sulphur component to a surface tension favourable to the formation of fine gas bubbles and including agitating the mixture to entrain gas from the atmosphere, in the mixture, in the form of fine gas bubbles.

19. A method according to claim 17, wherein said mixture comprises particulate calcium carbonate, said bubbles being generated by said calcium carbonate.

20. A method according to claim 17, wherein said mixture contains a finely divided material which thermally decomposes or dissociates to evolve entrainable gaseous material, effective to form said plurality of cells; said finely divided material thermally decomposing or dissociating at the temperature of the moldable mixture.

21. A method of producing a sulphur concrete comprising
   entraining a controlled amount of a plurality of fine gas bubbles in a moldable mixture comprising a particulate mineral aggregate and a sulphur component selected from the group consisting of molten elemental sulphur, modified phur and mixtures thereof, said mixture comprising 5 to 60%, by weight; of said sulphur component,
   uniformly dispersing the bubbles in the mixture as substantially spherical gas cells and
   solidifying the mixture to a sulphur concrete in which particles of the aggregate are bonded together by sulphur and said bubbles are dispersed throughout a matrix of said sulphur component.

22. A method according to claim 21, wherein said mixture comprises 5 to 20%, by weight, of said sulphur component.

23. A method according to claim 21, wherein said moldable mixture contains a surfactant effective to modify the surface tension of the molten sulphur component to a surface tension favourable to the formation of fine gas bubbles and including agitating the mixture to entrain gas from the atmosphere, in the mixture, in the form of fine gas bubbles.

24. A method according to claim 23, wherein said bubbles are dispersed with a maximum spacing factor of 2 mm.

25. A method according to claim 24, wherein said bubbles are dispersed with an average spacing factor of 0.1 to 1.5 mm, have a diameter of 0.05 to 0.5 mm and occupy not more than 50%, by volume, of the matrix.

26. A method according to claim 17, wherein said mixture contains a finely divided material from which entrapped liquid or gas is liberated, as gaseous material, at the temperature of the moldable mixture.

27. A composition according to claim 2, wherein said sulphur component is modified sulphur.

28. A composition comprising a particulate mineral aggregate and a sulphur component selected from the group consisting of elemental sulphur, modified sulphur and mixtures thereof, and a plurality of fine entrained substantially spherical cells uniformly dispersed throughout the composition, said cells occupying not more than 50%, by volume, of the composition, said sulphur component being present in an amount of 5 to 60%, by weight, of the composition, and said cells comprising gas cells with cell walls defined by the sulphur component.

29. A composition comprising a particulate mineral aggregate and a sulphur matrix component selected from the group consisting of elemental sulphur, modified sulphur and mixtures thereof, and a plurality of fine entrained generally spherical cells uniformly dispersed throughout the composition, said cells occupying not more than 50% by volume of the matrix and having walls defined by the sulphur component, said sulphur component being present in an amount of 5 to 60% by weight of the composition.

30. A composition according to claim 1, wherein at least part of the said mineral aggregate consists of a porous particulate material.

31. A composition according to claim 1, wherein said sulphur component is present in an amount of 5 to 20%, by weight, of the composition and said mineral aggregate is present in an amount of about 80 to 95% of said composition to a total of 100%, said mineral aggregate comprising 15 to 80%, by weight, of coarse aggregate; 5 to 85%, by weight, of fine aggregate and 0 to 20%, by weight, of fines to a total of 100%, based on the total weight of said mineral aggregate.

32. A composition according to claim 1, wherein said sulphur component is present in an amount of 20 to 60%, by weight, of the composition and said mineral aggregate is present in an amount of 40 to 80%, of said composition to a total of 100%, said mineral aggregate comprising 30 to 70%, by weight of fine aggregate and 30 to 70%, by weight of fines, to a total of 100%, based on the total weight of said mineral aggregate.

33. A composition according to claim 5, wherein said sulphur component is present in an amount of 5 to 20%, by weight of the composition and said mineral aggregate is present in an amount of about 80 to 95% of said composition to a total of 100%, said mineral aggregate comprising 15 to 80%, by weight of coarse aggregate; 5 to 85%, by weight, of fine aggregate and 0 to 20%, by weight, of fines to a total of 100%, based on the total weight of said mineral aggregate.

34. A composition according to claim 5, wherein said sulphur component is present in an amount of 20 to 60%, by weight of the composition and said mineral aggregate is present in an amount of 40 to 80% of said composition to a total of 100%, said mineral aggregate comprising 30 to 70%, by weight of fine aggregate and 30 to 70%, by weight of fines, to a total of 100%, based on the total weight of said mineral aggregate.

35. A composition according to claim 1, wherein said sulphur component is present in an amount of 5 to 20%, by weight of the composition and said mineral aggregate is present in an amount of about 80 to 95% of said composition to a total of 100%, said mineral aggregate comprising 15 to 80%, by weight of coarse aggregate; 5 to 85%, by weight, of fine aggregate and 0 to 20%, by weight, of fines to a total of 100%, based on the total weight of said mineral aggregate.

36. A composition according to claim 6, wherein said sulphur component is present in an amount of 5 to 20%, by weight of the composition and said mineral aggregate is present in an amount of about 80 to 95% of said composition to a total of 100%, said mineral aggregate comprising 15 to 80%, by weight of coarse aggregate; 5 to 85%, by weight, of fine aggregate and 0 to 20%, by weight of fines to a total of 100%, based on the total weight of said mineral aggregate.

37. A composition according to claim 6, wherein said sulphur component is present in an amount of 20 to 60%, by weight of the composition and said mineral aggregate is present in an amount of 40 to 80% of said composition to a total of 100%, said mineral aggregate comprising 30 to 70%, by weight of fine aggregate and 30 to 70%, by weight of fines to a total of 100%, based on the total weight of said mineral aggregate.

38. A composition according to claim 7, wherein said sulphur component is present in an amount of 5 to 20%, by weight of the composition and said mineral aggregate is present in an amount of about 80 to 95% of said composition to a total of 100%, said mineral aggregate comprising 15 to 80%, by weight, of coarse aggregate; 5 to 80%, by weight, of fine aggregate and 0 to 20%, by weight of fines to a total of 100%, based on the total weight of said mineral aggregate.

39. A composition according to claim 7, wherein said sulphur component is present in an amount of 20 to 60%, by weight of the composition and said mineral aggregate is present in an amount of 40 to 80% of said composition to a total of 100%, said mineral aggregate comprising 30 to 70% by weight of fine aggregate and 30 to 70%, by weight of fines to a total of 100%, based on the total weight of said mineral aggregate.

40. A method according to claim 18, wherein said sulphur component comprises 5 to 20%, by weight of said mixture and said mineral aggregate comprises 80 to 95% of said mixture to a total of 100%; said mineral aggregate comprising 15 to 80%, by weight of coarse aggregate; 5 to 85% by weight of fine aggregate and 0 to 20%, by weight of fines to a total of 100%, based on the total weight of said mineral aggregate.

41. A method according to claim 18, wherein said sulphur component comprises 20 to 60%, by weight of said mixture and said mineral aggregate comprises 40 to 80% by said mixture to a total of 100%, said mineral aggregate comprising 30 to 70%, by weight of fine aggregate and 30 to 70%, by weight of fines to a total of 100%, based on the total weight of said mineral aggregate.

42. A composition according to claim 28, wherein said sulphur component is present in an amount of 5 to 20%, by weight of the composition and said mineral aggregate is present in an amount of about 80 to 95% of said composition to a total of 100%, said mineral aggregate comprising 15 to 80% by weight of coarse aggregate; 5 to 85% by weight of fine aggregate and 0 to 20% by weight of fines to a total of 100%, based on the total weight of said mineral aggregate.

43. A composition according to claim 28, wherein said sulphur component is present in an amount of 20 to 60%, by weight of the composition and said mineral aggregate is present in an amount of 40 to 80% of said composition to a total of 100%, said mineral aggregate comprising 30 to 70%, by weight of fine aggregate and 30 to 70% by weight of fines, to a total of 100%, based on the total weight of said mineral aggregate.

44. A composition according to claim 29, wherein said sulphur component is present in an amount of 5 to 20%, by weight of the composition and said mineral aggregate is present in an amount of about 80 to 95% of said composition to a total of 100%, said mineral aggregate comprising 15 to 80% by weight of coarse aggregate; 5 to 85% by weight of fine aggregate and 0 to 20% by weight of fines to a total of 100%, based on the total weight of said mineral aggregate.

45. A composition according to claim 29, wherein said sulphur component is present in an amount of 20 to 60% by weight of the composition and said mineral aggregate is present in an amount of 40 to 80% of said composition to a total of 100%, said mineral aggregate comprising 30 to 70% by weight of fine aggregate and 30 to 70% by weight of fines to a total of 100%, based on the total weight of said mineral aggregate.

46. A method of producing a solidified sulphur coating composition comprising:
agitating a moldable mixture comprising a particulate mineral aggregate, 75 to 90%, by weight of a molten sulphur component selected from the group consisting of elemental sulphur, modified sulphur and mixtures thereof and a surfactant effective to modify the surface tension of the molten sulphur component to a surface tension favourable to the formation of fine gas bubbles, to entrain gas from the atmosphere in the mixture, in the form of fine gas bubbles,
uniformly dispersing the fine bubbles in the mixture and
solidifying the mixture to a composition in which the matrix comprising the bubbles defines a plurality of fine entrained generally spherical gas cells having a maximum spacing factor of 2 mm and occupying not more than 50%, by volume, of said matrix.

47. A composition according to claim 1, wherein said cells have a maximum spacing factor in the sulphur component of about 2 mm.

* * * * *

UNITED STATES PATENT AND TRADEMARK OFFICE
CERTIFICATE OF CORRECTION

PATENT NO. : 4,426,456
DATED : January 17, 1984
INVENTOR(S) : GILLOTT et al.

It is certified that error appears in the above-identified patent and that said Letters Patent is hereby corrected as shown below:

Column 1, line 18, "aggretate" should read --aggregate--
Column 4, line 54, "periphery" should read --preferably--
Column 5, line 4, "mixture" should read --mixtures--
Column 6, line 32, "fraction" should read --fracture--
Column 7, line 13, "aggregae" should read --aggregate--
Column 7, line 17, "aggregte" should read --aggregate--
Column 7, line 43, "aggretate" should read --aggregate--
Columns 14 and 15, heading of Table I, "Thaw" should read --Freeze/Thaw--
Column 15, line 67, "selectd" should read --selected--
Column 17, line 60, "phur" should read --sulphur--

Signed and Sealed this

Twenty-fourth Day of July 1984

[SEAL]

Attest:

Attesting Officer

GERALD J. MOSSINGHOFF
Commissioner of Patents and Trademarks